June 19, 1934.  D. PATERSON  1,963,335
UNDERSLUNG BRAKE HEAD
Filed April 2, 1931

Inventor.
David Paterson.

Patented June 19, 1934

1,963,335

UNITED STATES PATENT OFFICE 1,963,335

UNDERSLUNG BRAKE HEAD

David Paterson, Toronto, Ontario, Canada, assignor to Frederick W. McNabb, August E. Pearson, and John Craddock, all of Toronto, Ontario, Canada Application April 2, 1931, Serial No. 527,313

5 Claims. (Cl. 188—236)

The principal objects of this invention are to effect a material reduction in the maintenance costs to railways in brake shoe equipment and to provide a brake shoe head which is applicable to either end of a brake beam and which will hang in a satisfactory underslung position, irrespective of the end of the beam to which it is fitted.

The principal feature of the invention consists in the novel construction of the brake head with a double flanged recess to receive the end of the brake beam bar whereby the heads are rigidly held in very positive relative position and recesses are formed in the head structure to receive the hanging links at the same angle when supported from either end.

In the drawing, Figure 1 is a perspective view of my improved brake shoe head and a portion of one end of the beam structure.

Figure 1:
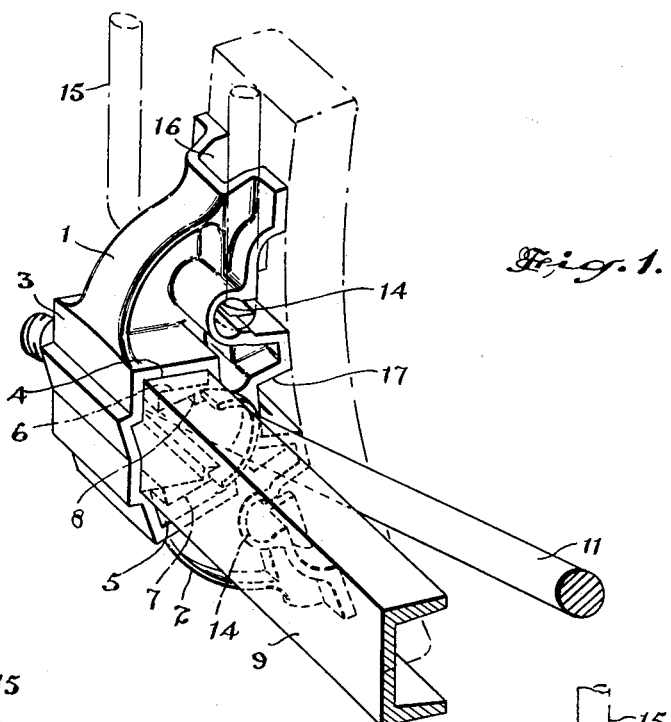
Figure 2:
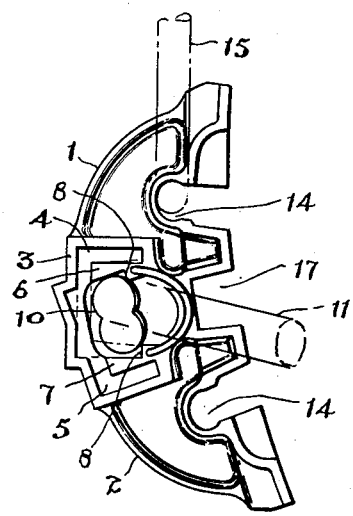
Figure 2 is an inside elevational view of the brake shoe head.
Figure 3:
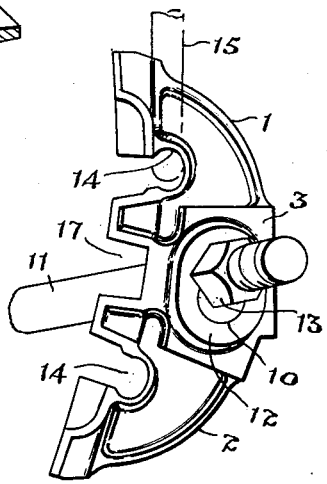
Figure 3 is an outside elevational view of the head showing one end of the beam brace bar therein.
Figure 4:
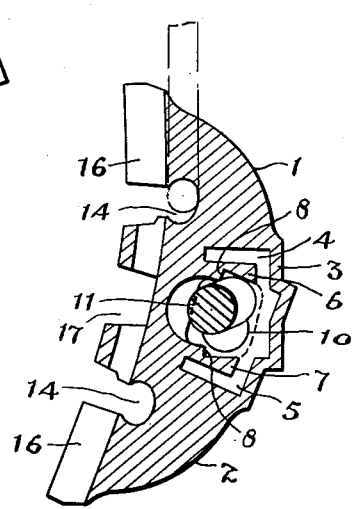
Figure 4 is a vertical mid-sectional view through the brake shoe head.

In the maintenance of stocks of brake shoe heads and brake beam parts it is always difficult to maintain an equal quantity of right and left heads and it is very desirable that a head be provided which may be utilized with equal facility on either end of a beam.

Many different forms of supposedly reversible brake shoe heads have been devised but the old types of right and left brake shoe heads are still to be found very largely in use.

In the invention shown herein the brake shoe head illustrated is cast with an arched back 1 and 2 extending either side of a central box-shaped structure 3. This central box-shaped structure is provided with two overlapping channel-shaped recesses 4 and 5, which are separated by the tongues 6 and 7, each of which is notched on the inside with a notch 8 to receive one flange of the channel-shaped brake beam 9.

The recesses 4 and 5 are open at one side but closed at the other and the shoe head is adapted to be slipped on to the end of the channel-shaped beam 9 with the ends of the beam abutting the outer wall.

An opening 10 is arranged centrally of the closed end of the box-shaped portion of the shoe head through which the end of the brace rod 11 extends. This opening is formed of two intersecting circle openings which permit the beam brace to slant in the proper direction without straining.

A bevelled boss 12 is arranged on the outside of the closed end of the shoe head so that a plane surface is provided in right angular relation to each of the aforesaid intersecting circle openings against which the nut 13 of the brace rod engages.

The arched backs 1 and 2 extend forwardly and are formed with flanged extensions in which are provided the notch recesses 14 which receive the supporting links 15. Similar notches are arranged at the opposite ends of the shoe head.

Transverse recesses 16 are arranged at each end of the shoe head and a central notch 17 is arranged equidistant therebetween to receive the holding lugs of the brake shoe.

A brake shoe head such as described is extremely simple in its formation. It is cast in one piece and may be fitted instantaneously on either end of a channel bar brake beam and when drawn tight to the end of the beam by means of the truss rod, it will retain its alignment with the beam and with the shoe on the other end. The head is perfectly symmetrical in its construction and may be reversed to be used for either side. There are no loose parts to become disengaged or lost and it will be readily appreciated that the cost of maintaining such heads in stock will greatly reduce the cost of brake beam maintenance.

It will be noted that the flange structure forming the recesses 4 and 5 is of greater width than the remaining portion of the shoe and that the recesses formed with the inner bearing tongues 6 and 7 present an extraordinary bearing to hold the shoe head rigidly on the beam.

What I claim as my invention is:

1. A brake shoe head having in combination suspension notches arranged equidistant either side of the centre to receive a suspension link, a pair of overlapping rectangular recesses opening at one side of the shoe and arranged midway between said notches and forming a pocket to differentially receive the respective ends of the brake beam, and an orifice extending through the closed side of the pocket formed by a pair of intersecting openings formed in positive predetermined angular relation to differentially receive the respective ends of the brake beam brace rod.

2. A brake shoe head formed of a single casting having a pair of overlapping rectangular channel-shaped socket formations for differentially receiving either end of a channel brake beam, each of said channel-shaped socket formations presenting spaced side walls for simultaneously engaging the inner and outer sides respectively of one of the side flanges of the beam in extended bearing contact, said casting having a pair of intersecting truss rod openings, extending therethrough disposed between the respective side walls of said channel-shaped sockets to differentially receive and engage the truss rod in positioning contact.

3. A brake shoe head having a centrally arranged socket formed of a pair of overlapping and angularly disposed channel-shaped recesses to receive the channel-shaped brake beam, rigid tongues being arranged to engage the inner faces of the outward flanges of the beam to interlock the shoe rigidly with the beam and present an extended bearing contact between the beam and head.

4. A reversible underslung brake shoe head having a pair of inter-nested overlapping channel-shaped recesses, one of said recesses being for the reception of one end of a channel-shaped brake beam and the other recess being for the reception of the other end of the brake beam, said channel-shaped recesses having their centres spaced apart in a direction longitudinally of the head to provide for the underslung mounting of said head on either end of the beam, said spaced channel recesses being convergently disposed one to the other in the shoe side direction.

5. A reversible underslung brake shoe head having a socket formed of a pair of overlapping channel-shaped recesses, both opening to the same side of the head to differentially receive the respective ends of a channel-shaped brake beam, said channel-shaped recesses having their centres spaced apart in a direction longitudinally of the head forming beam contacting lug formations therebetween and being convergently disposed one to the other in the shoe side direction, said head having a pair of truss rod openings extending between said lug formations.

DAVID PATERSON.